(12) United States Patent
Sheinfeld et al.

(10) Patent No.: US 8,799,070 B1
(45) Date of Patent: Aug. 5, 2014

(54) GENERATING SYNTHETIC ADVERTISEMENTS FOR AN ELECTRONIC ENVIRONMENT

(75) Inventors: Gil Sheinfeld, Palo Alto, CA (US); Slava Galperin, Palo Alto, CA (US); Mihnea Marinescu, Palo Alto, CA (US); Ilya Lipkind, Mountain View, CA (US)

(73) Assignee: A9.com, Inc., Palo Alto, CA (US)

(*) Notice: Subject to any disclaimer, the term of this patent is extended or adjusted under 35 U.S.C. 154(b) by 1227 days.

(21) Appl. No.: 12/548,297

(22) Filed: Aug. 26, 2009

(51) Int. Cl.
*G06Q 30/00* (2012.01)

(52) U.S. Cl.
USPC .................. 705/14.45; 705/14.72; 705/14.73

(58) Field of Classification Search
USPC .................. 705/14.45, 14.72, 14.73
See application file for complete search history.

(56) References Cited

U.S. PATENT DOCUMENTS

| 7,797,197 | B2 * | 9/2010 | Kumar et al. ............... 705/26.1 |
| 8,224,689 | B1 * | 7/2012 | Sandberg et al. .......... 705/14.42 |
| 2006/0101012 | A1 * | 5/2006 | Carson et al. ................. 707/4 |
| 2007/0005421 | A1 * | 1/2007 | Labio et al. .................. 705/14 |
| 2008/0082400 | A1 * | 4/2008 | Martel et al. ................. 705/10 |
| 2009/0063268 | A1 * | 3/2009 | Burgess et al. .............. 705/14 |

FOREIGN PATENT DOCUMENTS

WO    WO 2007135436 A1 * 11/2007 .............. G06F 17/30

* cited by examiner

*Primary Examiner* — Michael Bekerman
(74) *Attorney, Agent, or Firm* — Novak Druce Connolly Bove + Quigg LLP

(57) ABSTRACT

Techniques for injecting synthetic electronic advertisements into a production electronic advertisement system to test the effectiveness of new categories of electronic advertisement are provided. Synthetic advertisement content may be provided to real users of the production system in order to determine the effectiveness of new electronic advertisements and/or new categories of electronic advertisements. The synthetic advertisements content appears to users to be regular production advertisement that may include navigational element such as a hypertext link and associated text and/or graphics to be displayed in the electronic interface. Statistics regarding the effectiveness of the new electronic advertisements and/or new categories are gathered and may be used to determine which new electronic advertisements and/or new categories of electronic advertisements are effective enough to include in the production system. Various techniques for generating new electronic advertisements and/or new categories of electronic advertisements are provided.

18 Claims, 7 Drawing Sheets

GENERATING SYNTHETIC ADVERTISEMENTS FOR AN ELECTRONIC ENVIRONMENT

BACKGROUND

As the number of users viewing information and purchasing items electronically increases, there is a corresponding increase in the amount of advertising revenue spent in electronic environments. In some cases, advertisements are targeted to specific users or to specific web pages or other interfaces to be displayed to users. Advertisements also may be selected based on the content displayed on any number different pages displayed to a user or may also be selected based on search information, such as keywords, entered into a search engine as a user searches for content. Advertisements displayed to a user may also be related to the search results.

Often, an advertisement includes a hypertext link or other user-selectable element that enables the user to navigate to another page or display relating to the advertisement. The page or display relating to the advertisement may provide the user with the ability to purchase the products or services offered by the advertiser either directly from the advertiser or from a provider of the site. Advertisers hope to generate revenue by purchasing sponsored advertisements for display to users most likely to be interested in purchasing or otherwise consuming the products or services being advertised.

Advertising content may be grouped into categories, and advertisers may have a number of electronic advertisements in various categories. New categories of advertisements may be introduced, but determining which categories to introduce presents a number of challenges.

BRIEF DESCRIPTION OF THE DRAWINGS

Various embodiments in accordance with the present disclosure will be described with reference to the drawings, in which.

DETAILED DESCRIPTION

Figure 1:
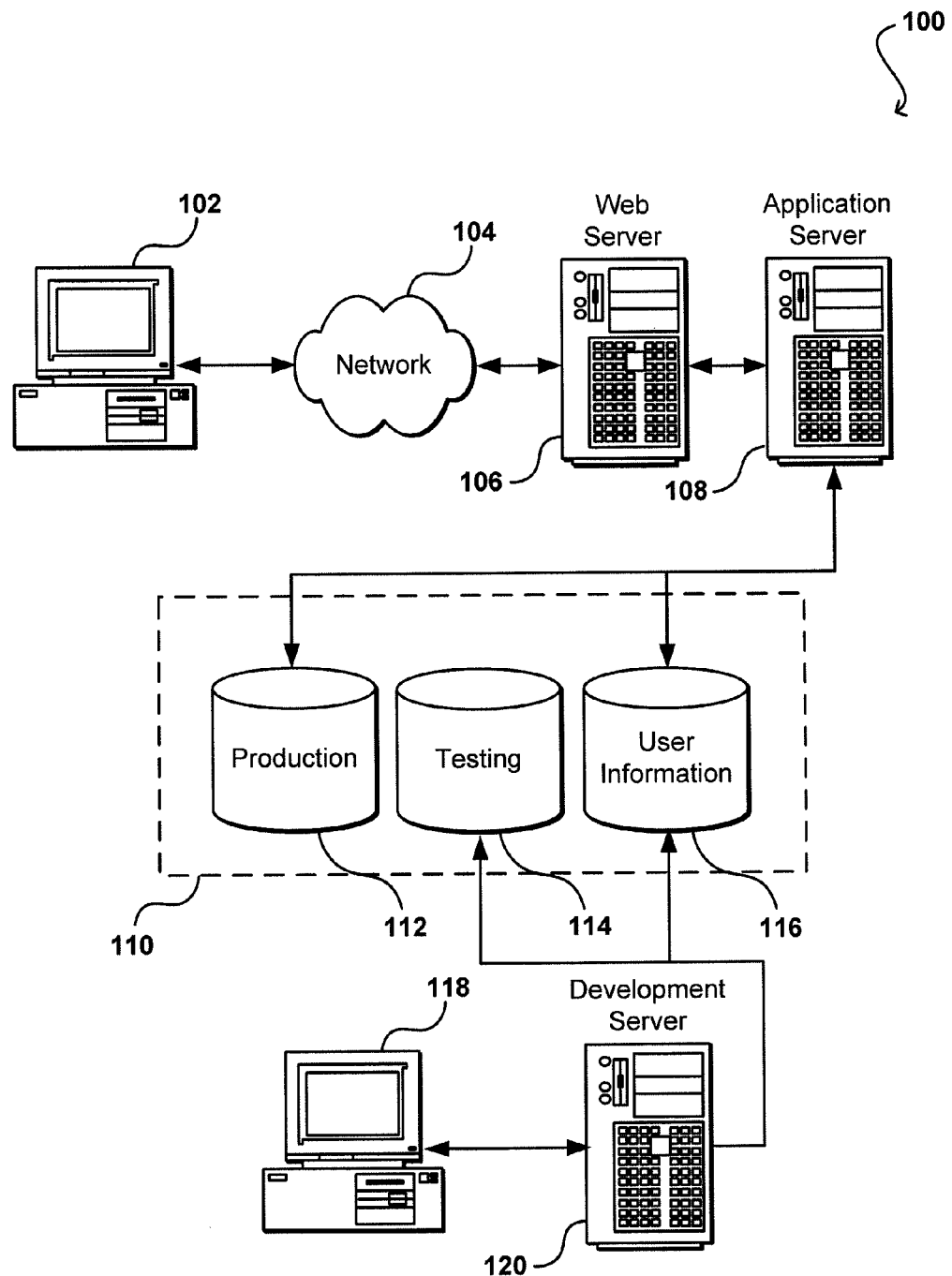
FIG. 1 illustrates an environment in which various embodiments can be implemented.

Systems and methods in accordance with various embodiments of the present disclosure may overcome one or more of the aforementioned and other deficiencies experienced in conventional approaches to creating and testing new categories, groupings, or types of advertisements or other supplemental content in an electronic environment. As known in the art, "sponsored links" or "sponsored ads" are typically used with electronic interfaces such as Web sites, search engines, applications, etc., wherein an advertiser provides a navigational element such as a hypertext link and associated text and/or graphics to be displayed in the electronic interface, that enable a user to select or otherwise access the navigational element to be directed to a page or other location provided by the advertiser. The advertiser typically will pay a provider of the electronic interface based upon an aspect of each sponsored ad, such as the number of times users select the navigational element included therein.

Advertisers may have advertisements active in multiple categories of electronic advertisements in an electronic advertisement system. Each of the active advertisements may be selected for display to a user in response to a request for an advertisement. The electronic advertisements may be classified into different categories of advertisements, and advertisers may bid for position within a category so that their advertisements may be more likely to be displayed to users.

An electronic advertisement system provider may wish to introduce new categories of advertisement on which advertisers may bid. Although categories are discussed herein for explanation purposed, it should be understood that any appropriate grouping of advertising by a common or appropriate aspect can be used as well within the scope of the various embodiments. Creating new categories of electronic advertisement and convincing advertisers to make use of these categories typically requires a significant investment of time and labor. A new category of electronic advertisement may not draw enough user interest to justify the investment of resources in creating and maintaining the new category. Furthermore, advertisers often face budgetary constraints that limit the number of categories on which they may bid, and may be reluctant to invest in a new category of electronic advertisements without having some indication as to the value of the category to the advertiser, such as may relate to the number of views, type of user viewing the category, type of content associate with the category, etc.

Systems and methods in accordance with various embodiments are provided to test new advertisement categories and new advertisements in the context of targeted advertising directed to particular users and/or in the context of new placements, i.e., providing electronic advertisements for display on new electronic interfaces. At least some of these embodiments make use of what will be referred to herein as "synthetic ads," or advertisements that are not created by an advertiser or other such entity. Techniques for injecting synthetic electronic advertisements into a production electronic advertisement system are provided. The synthetic advertisement content may be provided to real users of the production system in order to determine the effectiveness of new electronic advertisements and/or new categories of electronic advertisements. The synthetic advertisements content appears to users to be regular production advertisement that may include navigational element such as a hypertext link and associated text and/or graphics to be displayed in the electronic interface. Statistics regarding the effectiveness of the new electronic advertisements and/or new categories are gathered and may be used to determine which new electronic advertisements and/or new categories of electronic advertisements are effective enough to include in the production system. Various techniques for generating new electronic advertisements and/or new categories of electronic advertisements are provided.

FIG. 1 illustrates an example of an environment 100 for implementing aspects in accordance with various embodiments. As will be appreciated, although a Web-based environment is used for purposes of explanation, different environments may be used, as appropriate, to implement various embodiments. The environment 100 shown includes both a testing or development portion (or side) and a production portion. The production portion includes an electronic client device 102, which can include any appropriate device operable to send and receive requests, messages, or information over an appropriate network 104 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, as the environment includes a Web server 106 for receiving requests and serving content in response thereto, although for other networks an alternative device serving a similar purpose could be used as would be apparent to one of ordinary skill in the art.

The illustrative environment includes at least one application server 108 and a data store 110. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between the client device 102 and the application server 108, can be handled by the Web server. It should be understood that the Web and application servers are not required and are merely example components, as structured code discussed herein can be executed on any appropriate device or host machine as discussed elsewhere herein. Further, the environment can be architected in such a way that a test automation framework can be provided as a service to which a user or application can subscribe. A test automation framework can be provided as an implementation of any of the various testing patterns discussed herein, although various other implementations can be used as well, as discussed or suggested herein.

The environment also includes a development and/or testing side, which includes a user device 118 allowing a user such as a developer, data administrator, or tester to access the system. The user device 118 can be any appropriate device or machine, such as is described above with respect to the client device 102. The environment also includes a development server 120, which functions similar to the application server 108 but typically runs code during development and testing before the code is deployed and executed on the production side and is accessible to outside users, for example. In some embodiments, an application server can function as a development server, and separate production and testing storage may not be used.

The data store 110 can include several separate data tables, databases, or other data storage mechanisms and media for storing data relating to a particular aspect. For example, the data store illustrated includes mechanisms for storing production data 112 and user information 116, which can be used to serve content for the production side. The data store also is shown to include a mechanism for storing testing data 114, which can be used with the user information for the testing side. It should be understood that there can be many other aspects that may need to be stored in the data store, such as for page image information and access right information, which can be stored in any of the above listed mechanisms as appropriate or in additional mechanisms in the data store 110. The data store 110 is operable, through logic associated therewith, to receive instructions from the application server 108 or development server 120, and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device 102. Information for a particular item of interest can be viewed in a dedicated page or window of the browser.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limiting to the scope of the disclosure.

Figure 2:
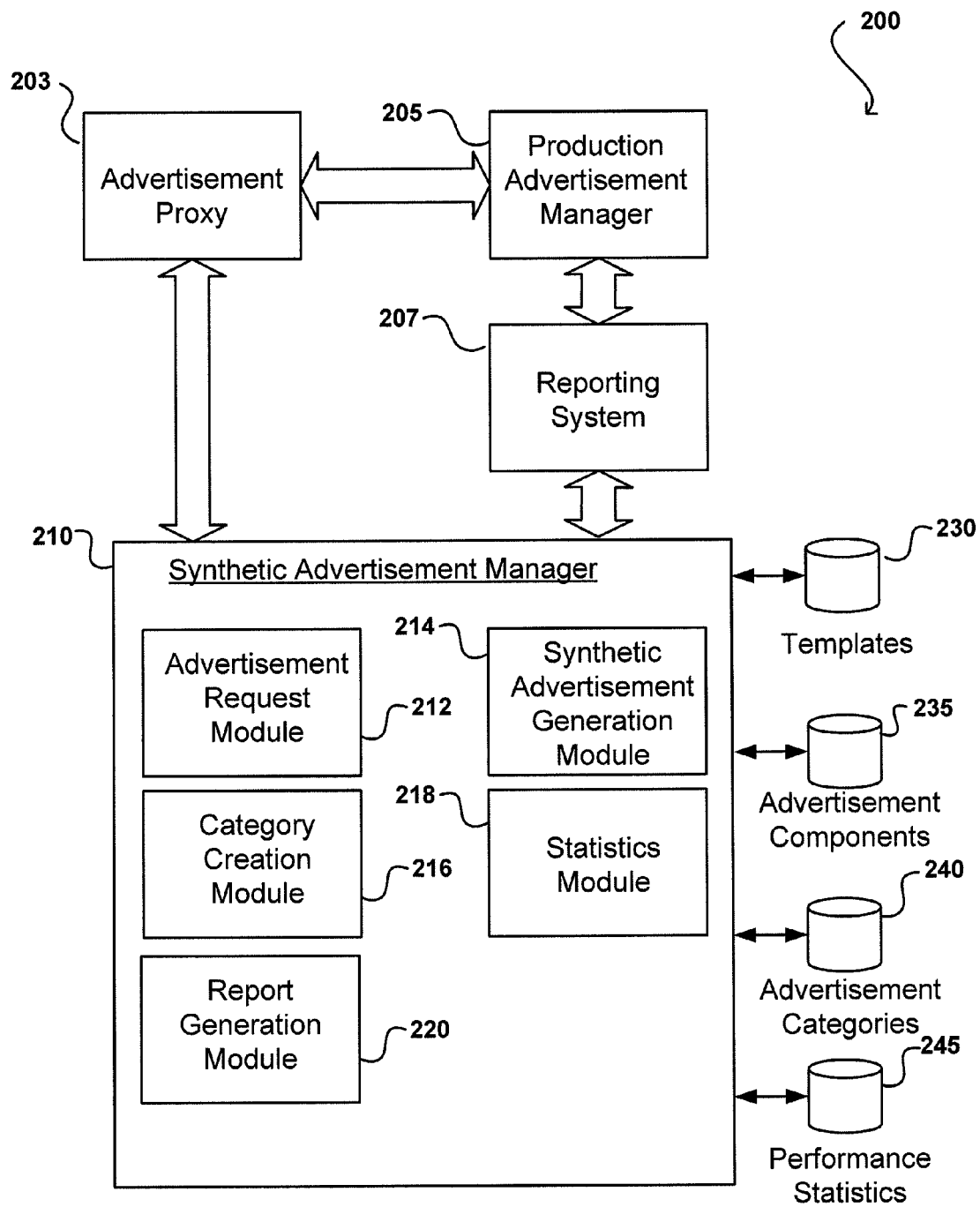
FIG. 2 illustrates components for managing and generating synthetic advertisement content that can be used in accordance with one embodiment.

An environment such as that illustrated in FIG. 1 can be useful for a provider such as an electronic advertisement content provider that provides electronic advertisements to consumers of electronic advertisements, such as may be displayed on web sites, wherein multiple hosts might be used to perform tasks such as generating synthetic advertisement content, serving production advertisement content and synthetic advertisement content, authenticating users, performing payment transactions, or performing any of a number of other such tasks. Some of these hosts may be configured to offer the same functionality, while other servers might be configured to perform at least some different functions. The electronic environment in such cases might include additional components and/or other arrangements, such as those illustrated in the configuration 200 of FIG. 2. In this example, an advertisement proxy 203 receives requests for electronic advertisements and determines whether to forward the request to production advertisement manger 205 or to synthetic advertisement manager 210 for processing. Production advertisement manager 205 processes request for advertisements and returns advertisements associated with an advertiser that has subscribed to have the electronic advertisement content provider serve the advertiser's ads to users.

Advertisement proxy 203 may user various techniques for determining whether to select a production advertisement or synthetic advertisement. According to some embodiments, synthetic advertisements may be provided in response to a certain number of or certain percentage of advertisement requests over a predetermined period of time and the determination to select a synthetic advertisement versus a production advertisement may be based on how many or what percentage of synthetic advertisements have already been served for a current period. For example, a synthetic advertisement may be selected in response to every Nth advertisement request (e.g., every $20^{th}$ request), where N is an integer value greater than one. Other techniques may also be used to determine whether to select an electronic advertisement versus a production advertisement in response to a request for an electronic advertisement. For example, an electronic advertisement content provider may allocate a percentage of the content provider's operating budget for testing new categories and/or types of advertisements. A synthetic advertisement might be selected over a production advertisement if a revenue threshold has been reached as a result of serving production advertisements.

Synthetic advertisement manager 210 responds to requests for electronic advertisements, generates synthetic electronic advertisements, generates electronic advertisement categories, manages components of electronic advertisements and templates for creating new synthetic electronic advertisements. Synthetic advertisement manager 210 includes advertisement request module 212, synthetic advertisement generation module 214, advertisement rating module 216, category creation module 218, statistics module 220, and report generation module 222. Synthetic advertisement manager 210 reads data from and/or writes data to templates data store 230, advertisement components data store 235, advertisement categories data store 240, and performance statistics data store 250. Data stores 230, 235, 240, and 245 may, in some embodiments, be implemented as part of synthetic advertisement manager 210 while in other embodiments of the present invention, data stores 230, 235, 240, and 245 are implemented separately from advertisement manager 210.

Synthetic advertisement request module 212 processes requests for electronic advertisements received by synthetic advertisement manager 210 received from a client and forwarded by advertisement proxy 203. For example, the client may be a web server requesting electronic advertisements to be integrated into a web page. Synthetic advertisement request module 212 may select existing synthetic electronic advertisements from advertisement components data store 235 or may request that a new electronic advertisement be generated by synthetic advertisement generation module 214. In an embodiment, synthetic advertisements may be selected based from advertisement components data store 235 on attributes of the request and/or attributes of a user to whom the synthetic advertisement is be displayed. For example, if a request for an electronic advertisement originates from a travel-related web site, a user browsing content on this web site is likely to be interested in travel, and thus, a synthetic advertisement related to travel products or services may be selected from advertisement components data store 235 or a new synthetic advertisement may be generated. In another example, a user browsing home repair related content may be interested in purchasing tools or in the services of a contractor for home repairs, and a synthetic advertisement related to tools or home repair contractors may be selected or generated.

In some embodiments, a category of advertisements to be tested for effectiveness may be selected from advertisement categories data store 240 and an electronic advertisement related to the category may be selected from advertisement components data store 235. Alternatively, a new synthetic advertisement may be generated by synthetic advertisement generation module 214.

Synthetic advertisement generation module 214 may be used to generate a new electronic advertisement for a category from advertisement categories data store 240 using advertisement components from advertisement components data store 235. Advertisement components data store 235 may include images, video content, text, animated content such as flash and/or other advertisement content. In an embodiment, advertisement generation module 214 may use predefined templates from templates data store 230 to create electronic advertisements using advertisement components from advertisement components data store 235 to generate new electronic advertisements that are related to a category of advertisements to be tested by using synthetic advertisements. The synthetic advertisements generated by synthetic advertisement generation module 214 may be similar in appearance to regular production advertisements, and may include navigational element such as a hypertext link and associated text and/or graphics to be displayed in the electronic interface, such as are included in regular productions advertisements.

Various techniques may be used to create new synthetic advertisement content for a category to be tested for aspects such as effectiveness. One such technique is to create a generic electronic advertisement for a category that is associated with one or more keywords that may be submitted to a third party electronic advertising provider if a user activates a navigational element of the advertisement. For example, an electronic advertisement content provider may wish to test a new category for "flat screen television installation services" for consumers who wish to have a flat screen television mounted on a wall or otherwise installed in a residence. In order to determine the effectiveness of a potential new category of electronic advertisement, a generic advertisement may be created for the category that does not advertise any particular product or service provider. The synthetic advertisement may simply comprise text or may include one or more audiovisual media components, such as images, sound, and/or video, selected from advertisement components data store 235. For example, an electronic advertisement that includes the text "Are you interested in flat screen television installation services?" may be generated to gauge interest in the new category for "flat screen television installation services," and a set of one or more keywords or key phrases may also be associated with the synthetic advertisement, such as "installation," "television," "flat screen," and "wall mount."

A navigational element of the synthetic advertisement, when activated, may send the set of keywords associated with the category to a third party electronic advertisement content provider to provide an advertisement associated with the keywords. In some embodiments, locality information for the user to whom the advertisement is to be displayed may also be provided to the third party electronic advertisement content provider. For example, if the user is located in San Francisco, the term "San Francisco" may be included in the keywords provided the third party advertiser in order to receive an advertisement for installation service providers in the San Francisco area.

Another technique that may be used to generate synthetic advertisement content is to search for product and/or service providers in an online product or services directory, such as an online yellow pages provider, using search terms related to the a potential new category of electronic advertisement. One or more product and/or service providers may be identified and selected for use in synthetic advertisements. The resulting synthetic advertisements would advertise real product and/or service providers resulting in free advertising for the selected product and/or service providers. The electronic advertisement content provider could later approach the selected product and/or service providers to offer them advertising services related to the new category of electronic advertisement if the new category proves to be effective based on the performance of the synthetic advertisements associated with the category.

Category creation module 216 may be used to create new categories of electronic advertisements to be tested for effectiveness by providing synthetic advertisements related to the new categories. Various techniques may be used for creating new categories to be tested using synthetic advertisements. One technique that may be used is manual creation of new categories. that In an embodiment, an administrator or other person may manually create new advertisement categories to be tested using synthetic advertisements. Category creation module 216 may provide a user interface, such as a web page, that enables a user to define new categories of synthetic advertisements. The new categories of synthetic may be added to advertisement categories data store 240. The user interface of category creation module 216 may also enable a user to manage existing categories to be tested for synthetic advertisement, such as modifying the category information or removing categories to be tested from advertisement categories data store 240.

Another technique that may be used to create new categories is to use a "crawler" application to extract category information from content provided buy an online product and/or service provider directory, such as an in online yellow pages provider. The crawler application may "crawl" or systematically browse an online directory to identify various categories that may be used for new categories of electronic advertisements.

Statistics module 218 may be used to collect statistics data about the synthetic advertisements that have been selected or generated in response to requests for electronic advertisements and to write the statistics data to performance statistics data store 245. Statistics regarding the effectiveness of a synthetic advertisement may be gathered by executing a script or executable program in response to a user clicking on or otherwise activating a navigational element embedded in a synthetic advertisement. For example, if a user clicks on an advertisement, the advertisement may be deemed to have been successful. In some embodiments, statistics may be focused on various dimensions such as time-of-day, day-of-the-week, client-derived information (including, but not limited to, geographical location), and/or other dimensions that may useful for analyzing the performance of the synthetic advertisement.

Report generation module 220 may be used to generate reports illustrating the effectiveness of various categories of electronic advertisements. Report generation module 220 may generate the reports using the statistics from performances statistics data store 245. The reports may be generated as electronic documents, web pages, and/or as physical printed documents. Electronic copies of the report may be automatically generated periodically and transmitted an administrator or other user associated with the electronic advertisement content provider. In some embodiments, report generation module 220 may receive requests from reporting system 207 to generate report data regarding synthetic advertisement performance and provide the report data to reporting system 207. In some embodiments, reporting system 207 may also request report data from production advertisement manger 205, and in some embodiments, reporting system 207 may combine reporting data from report generation module 220 with report data from production advertisement manger 205 to generate a comparison of the performance of various advertisement categories in the production and synthetic advertisement systems. These comparisons may be useful for illustrating to the electronic advertisement content provider and clients and/or potential clients of the effectiveness of new categories of electronic advertisements tested using synthetic advertisements. If advertisements associated with a new category of advertisements are successful based on statistics gathered by statistics module 218, an electronic advertisement content provider may generate reports that may be shared with a prospective advertiser to show what the potential return on investment might be for advertisements associated with the new category.

Figure 3:
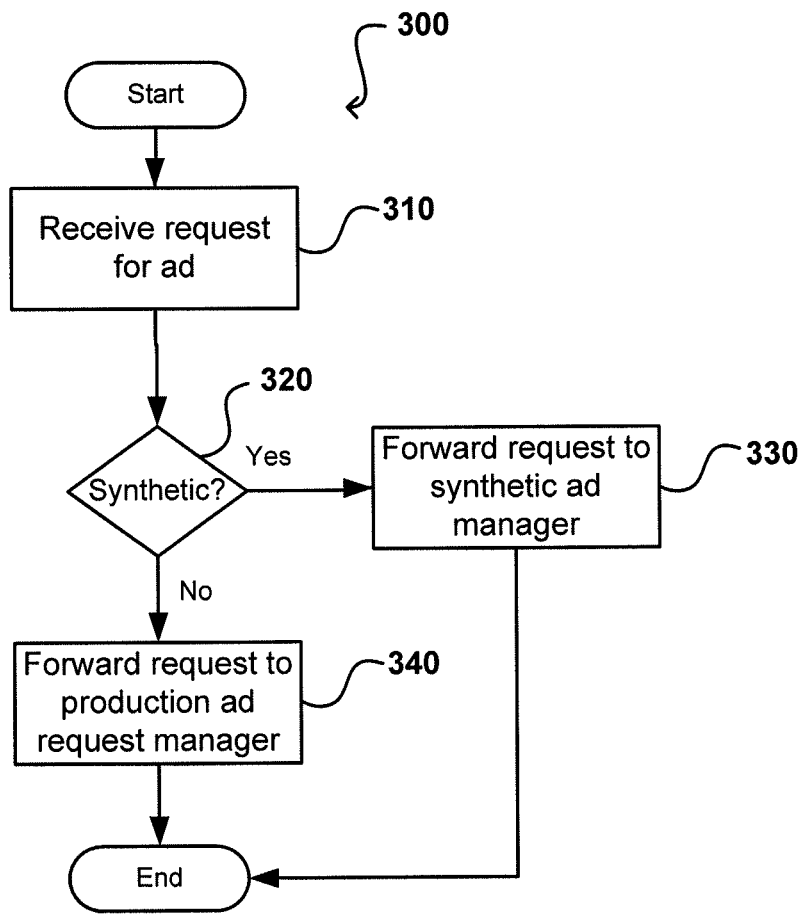
FIG. 3 illustrates steps of a process for selecting an electronic advertisement source in accordance with one embodiment.

FIG. 3 illustrates steps of a process 300 for selecting an electronic advertisement source in accordance with one embodiment. A request for an electronic advertisement is received from a client (step 310), such as a web server requesting electronic advertisements to be integrated into a web page or other electronic interface. A determination is made whether to serve a production advertisement or a synthetic advertisement to the client (step 320). A production advertisement may be selected from a set of advertisements provided by or generated for advertisers who have contracted with the electronic advertisement content provider to serve the advertiser's advertisements to client. A synthetic advertisement may be selected from a set of synthetic advertisements generated by the electronic advertisement content provider to be used to test new categories of advertisements for effectiveness. Determining whether to select a production advertisement or a synthetic advertisement may be based on a number of different factors. In an embodiment, synthetic advertisements may be provided in response to a certain number of or certain percentage of advertisement requests over a predetermined period of time. For example, an electronic advertisement content provider may allocate a percentage of the content provider's operating budget for testing new categories and/or types of advertisements. In an embodiment, a synthetic advertisement may be provided in response to every Nth advertisement request, where N is an integer value greater than one. For example, a synthetic advertisement may be provided in response to every $20^{th}$ request for an electronic advertisement. According to some embodiments, a dynamic algorithm may be used to determine whether to select a production advertisement or a synthetic advertisement that balances the value extracted from production advertisements with the knowledge that certain new categories may or may be productive if included in the production system. The dynamic algorithm may base the decision to provide a production advertisement or a synthetic advertisement based one or more factors, such as the value extracted from production advertisements (e.g., revenue generated by production advertisements over a period of time), the number of advertisements to be provided for display concurrently to a user (a mix of production and synthetic advertisements might be presented to a user concurrently), the number of synthetic and production advertisements that have been provided in response to requests for electronic advertisements, and/or other factors, such as time-of-day, day-of-the-week, client-derived-information (including but not limited to geographical location), and/or other factors. The values of the various factors considered by the algorithm may change over time, and thus, the decision to provide a synthetic advertisement or a production advertisement may reflect current conditions within the production advertisement system and the synthetic advertisement system.

If a synthetic advertisement is to be served to the client in response to the request, the request for the electronic advertisement is forwarded to a synthetic advertisement manager for processing (step 330). If a production advertisement is to be served to the client, the request for the electronic advertisement is forwarded to a production advertisement manager for processing.

Figure 4:
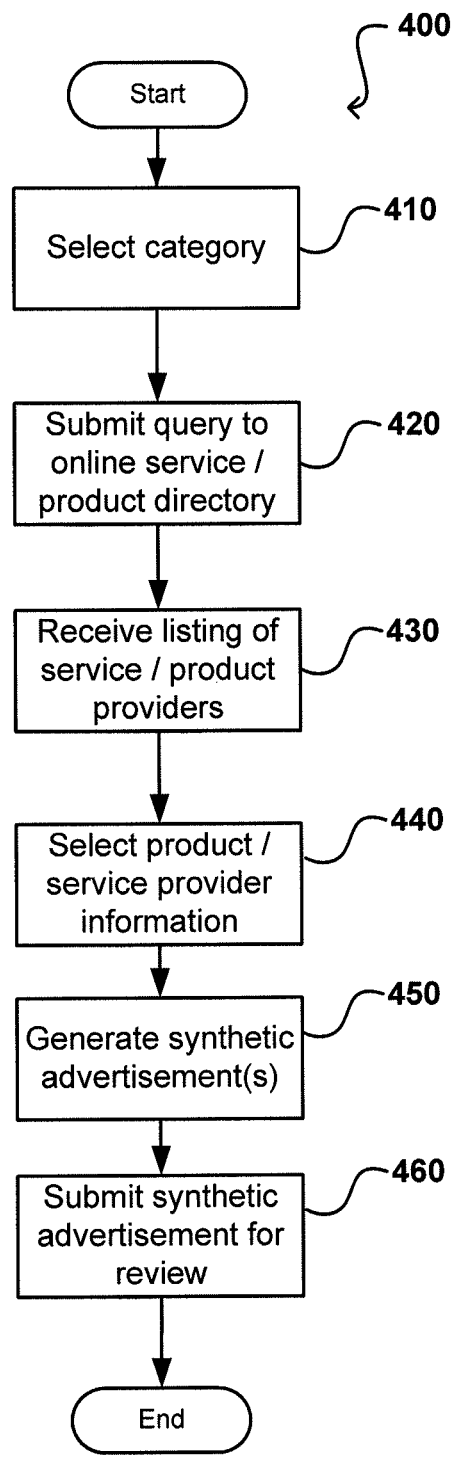
FIG. 4 illustrates steps of a process for generating synthetic advertisements in accordance with one embodiment.

FIG. 4 illustrates steps of a process 400 for generating synthetic advertisements in accordance with one embodiment. A category of advertisement to be tested for effectiveness is selected (step 410). In an embodiment, the category of advertisement to be tested for effectiveness may be selected from an advertisement categories data store used to store categories to be tested or being tested for effectiveness. Various techniques for identifying new categories of electronic advertisements to be tested for effectiveness are described below.

After selecting a category of electronic advertisement to be tested, a search query may be submitted to an online product or service directory to identify providers of products or services related to the electronic advertisement category to be tested (step 420). For example, if a new advertisement category for flat screen television installation is to be tested, a search query may be submitted to an online service provider directory, such as an online yellow pages provider, to obtain a list of service providers that install flat screen televisions. According to some embodiments, additional information such as geographic information may be included to obtain a list of product or service providers in a particular geographic area. For example, an electronic service provider may wish to test a new category for "wedding cake designers" and want to test results in a specific geographic location, such as New York City. A search query that for wedding cake designers may be submitted to an online business directory that includes the search term "New York City" to limit the providers to be included in the testing to the New York City geographic area.

In response to the search query, a listing of product and/or service providers related to the category may be received from the online business directory (step 430). If the search query does not result in any product or service providers for a particular category being tested, the lack of results may indicate that there is not a need for such a category of electronic advertisements at the present time. The listing of product and/or service providers may include various information for the product and/or service providers, such as telephone numbers, addresses, email addresses, fax numbers, and/or other information. This information may be incorporated into synthetic advertisements for the product and/or service providers.

Product and/or service provider information is selected from the listing of the search results (step 440). One or more product and/or service providers may be selected use in testing the effectiveness of the new category of electronic advertisements. A synthetic advertisement may then be generated for each of the one or more product and/or service providers selected from the list of search results. In some embodiments, a synthetic advertisement may be constructed using templates stored in a template data store and one or more advertising components, such as images, video content, and/or textual content, stored in an advertisement components data store.

For example, if a search for "wedding cake designers" in New York City returned fifteen bakeries that design wedding cakes, two of the bakeries might be selected for use in creating synthetic advertisements: "Caketastic" and "Sara's Devine Desserts." For example, a synthetic advertisement may created for "Caketastic" that includes an image of a wedding cake, text related to the category "Looking for a wedding cake designer in New York City?," and image or text identifying "Caketastic." The electronic advertisement may also include a navigational element, that when activated by a user viewing the synthetic advertisement, provides information back to the synthetic advertisement manager that the advertisement was of interest to a user. Activating the navigational element may also forward the user to a website related to the business being advertised. A template from a template data store may also be used to create the layout of a synthetic advertisement created using components from an advertisement component data store.

According to some embodiments, synthetic advertisements may be generated automatically from search result listings based on the category being created, information associated with the search results, and/or other information. For example, stock text and/or audiovisual content may be selected from an advertisement components data store based on the category "wedding cake designers." Stock video or images may be selected that illustrate a wedding cake, a bride and groom, or a baker making a cake. The stock electronic advertisement components may have one or more descriptive tags associated with the components that enable content that may be related to a new category to be automatically selected from an electronic advertisement component data store. According to some embodiments, a synthetic advertisement may also be manually assembled manually. For example, an administrator or designer for an e electronic advertisement content provider may manually select components from an electronic advertisement component data store to construct a new synthetic advertisement. Once completed, a synthetic advertisement may be stored in an electronic advertisement components data store and associated with the new category to be tested. According to some embodiments, the creation of advertisements may be outsourced to third parties for creation. For example, an electronic advertisement content provider may outsource some or all creation of synthetic advertisement content through an outsourcing service such as Amazon.com's Mechanical Turk, where human intelligence is better able to perform certain tasks than a computer.

According to some embodiments, a synthetic advertisement may be submitted review to prior to being served to users requesting electronic advertisements (step 460). Synthetic advertisements may be reviewed to determine whether the electronic advertisement components selected to construct the synthetic advertisement form a coherent product that appears similar to an electronic advertisement that might be generated by a production advertisement system. For example, the colors of the various components included in the synthetic advertisement may be reviewed to ensure that they do not clash with one another, and the text and/or audiovisual content included in the synthetic advertisement may be reviewed to determine whether the selected audiovisual components represent the sort of content that might be included in a production advertisement.

Review of the synthetic advertisements may be performed by one or more persons such as designers or administrators of an electronic advertisement content provider. In some embodiments, review of the synthetic advertisement content may be performed through an outsourcing service such as Amazon.com's Mechanical Turk, where people are contracted to review and provide feedback on a synthetic advertisement. In some embodiments multiple versions of a synthetic advertisement may be created using different electronic advertisement content and/or different attributes, such as colors of advertisement components such as the background or a font used for text components of the synthetic advertisement. The multiple versions of a synthetic advertisement may be provided to contract workers on an outsourcing service to select an advertisement from the multiple versions of the synthetic advertisement that best represents the product or service provider represented in the synthetic advertisement. According to some embodiments, the multiple versions of synthetic advertisements may be presented to multiple people for review, and the feedback aggregated to determine which synthetic advertisement best represents the product or service provider associated with the advertisement. According to some embodiments, each reviewer votes for a favorite version of a synthetic advertisement and the version receiving the most votes is selected. The selected version of the synthetic advertisement may then be stored in an advertisement components data store until an advertisement associated with the new category to be tested is needed.

Figure 5:
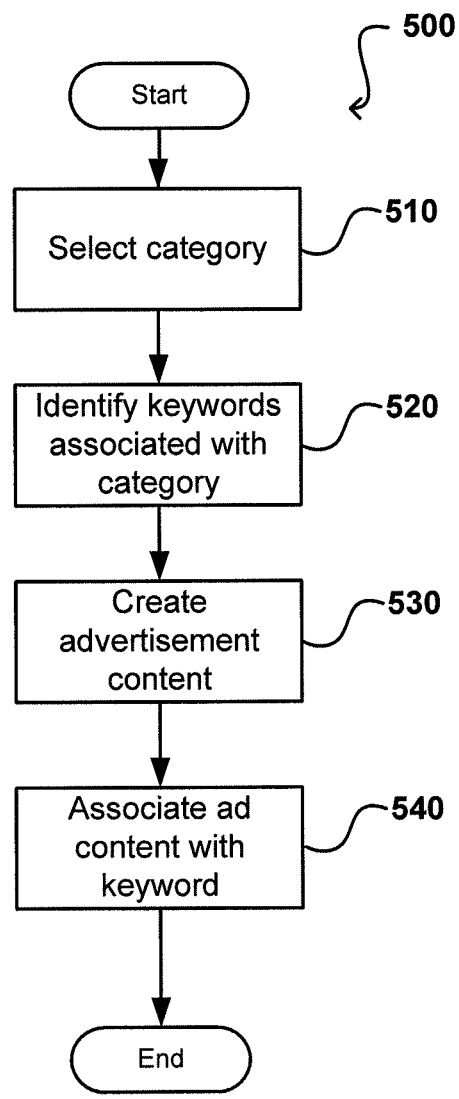
FIG. 5 illustrates steps of another process for generating synthetic advertisements in accordance with one embodiment.

FIG. 5 illustrates steps of another process 500 for generating synthetic advertisements in accordance with one embodiment. A category of advertisement to be tested for effectiveness is selected (step 510). As described above, in some embodiments, a category of advertisement to be tested for effectiveness may be selected from an advertisement categories data store used to store categories to be tested or being tested for effectiveness.

After selecting a category, one or more keywords that describe the category may be identified (step 520). The keywords may be used as search terms in a structured search engine to identify advertisement content related to the new category of electronic advertisements to be tested for effectiveness. For example, a new category may be tested for "scrapbooking suppliers" and various keywords such as "scrapbook," "memory," "photograph," and "craft." These keywords may be submitted to a structured search engine that provides search results that include sponsored advertisement content related to the submitted keywords. The sponsored advertisement content may be used to generate synthetic advertisement content for the new category of electronic advertisements to be tested that includes a real business or service provider that may provide products or services related to the new category of electronic advertisements.

After identifying keywords associated with the new category, a synthetic advertisement may be created and associated with the category and keywords (step 530). For example, a synthetic advertisement may be generated that includes the text "Are you interested in scrapbooking supplies?" that is not associated with a particularly product or service provider. According to some embodiments, synthetic advertisement content may be generated automatically by selecting stock text and/or audiovisual from an advertisement components data store based on the category information and/or the keywords identified as being associated with the category. The stock electronic advertisement components may have one or more descriptive tags associated with the components that enable components to be selected from the electronic advertisement components data store that may be related to the new category of electronic advertisement to be tested for effectiveness. In some embodiments, creation of the synthetic advertisement content may be completed through an outsourcing service such as Amazon.com's Mechanical Turk, where human intelligence is better able to perform certain tasks than a computer.

Once the content has been created, keywords identified as relevant to the category may be associated with the synthetic advertisement (step 540). The synthetic advertisement may include a navigational element, that when activated by a user viewing the synthetic advertisement, provides information back to the synthetic advertisement manager that the advertisement was of interest to the user and causes the user to navigate to content related to the product and/or service provider being advertised by the synthetic advertisement. For example, if a user activates the navigational element of a synthetic advertisement, a synthetic advertisement manager may submit the category information and/or the keywords associated with the synthetic advertisement to a search engine to obtain a listing of search results related to new category being tested. The search result list may be presented to the user or an advertisement for a product and/or service provider selected from the list of search results, or in some embodiments, the user may be directed to content, such as a website, related to a search result. According to some embodiments, additional information specific to a user, such as a user's location, may be included in the information submitted to the search engine. For example, if a user clicks on the synthetic advertisement for scrapbooking suppliers described in the example above, the keywords "scrapbook," "memory," "photograph," and "craft" may be submitted to the structured search engine as search terms. In some embodiments, the category "scrapbooking suppliers" may also be submitted as a search term. Furthermore, the location of the user that clicked the advertisement may also be determined through various techniques, such as using an Internet Protocol (IP) address associated with the user that clicked the synthetic advertisement to provide a listing of results that is related to a geographic location of the user.

The synthetic advertisement and the related keywords may be stored in advertisement components data store with a cross reference to the category stored in an advertisement categories data store.

Figure 6:
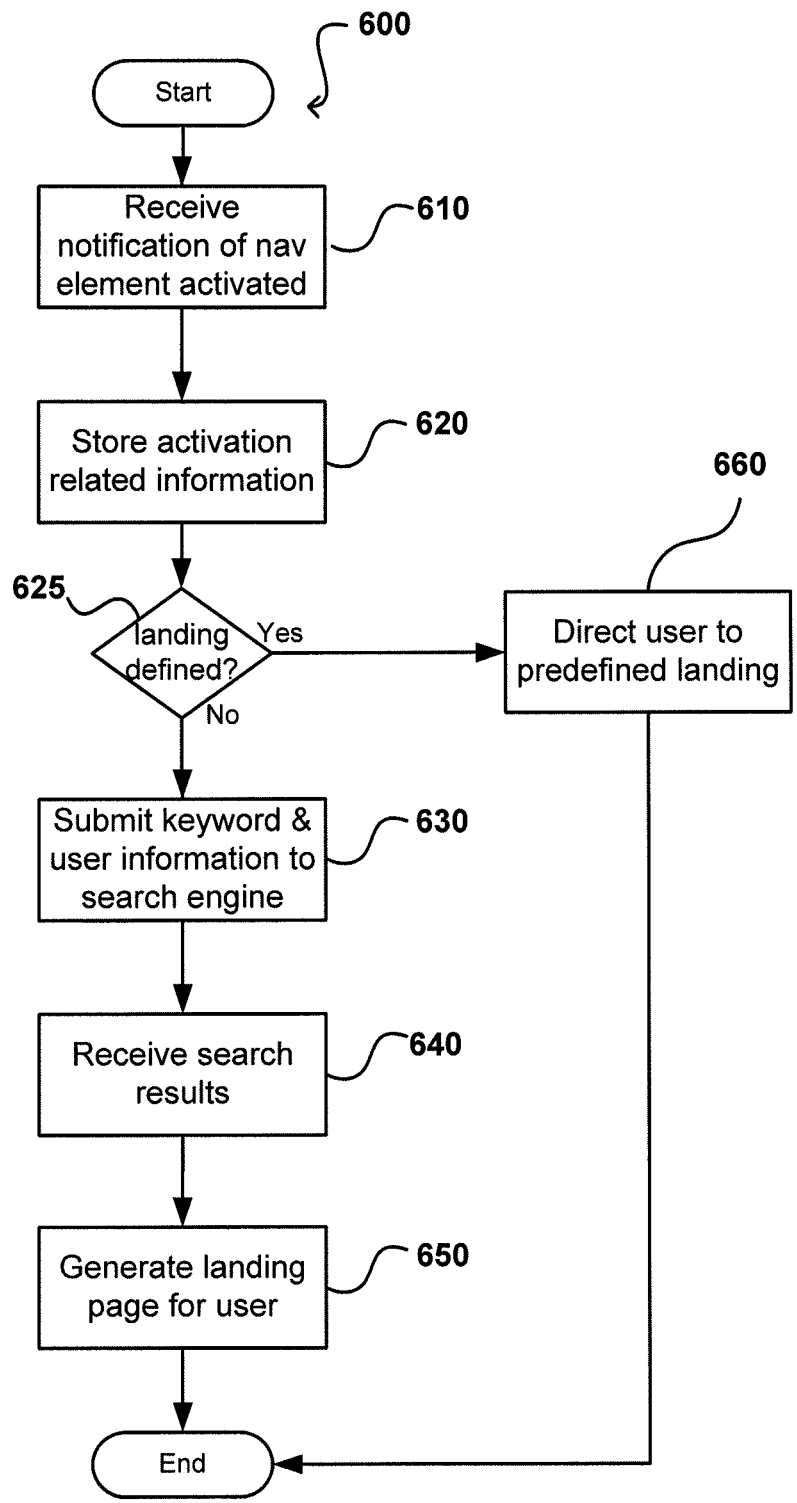
FIG. 6 illustrates steps of a process for collecting statistics from a synthetic advertisement.

FIG. 6 illustrates steps of a process 600 for collecting statistics from a synthetic advertisement. A synthetic advertisement may include a navigational element, such as a hyperlink, that when activated by a user, causes the user to be directed to a page or other location provided by the electronic advertisement content provider. Activating the navigational element notifies the synthetic advertisement manager that the navigational element of synthetic advertisement has been activated (step 610). For example, information identifying the synthetic advertisement that had a navigational element activated, a time that the navigational element was activated, and user information may be sent to synthetic advertisement manager as a result of the advertisement being clicked. According to some embodiments, synthetic advertisement manager may also direct the user to a page or other location in response to the synthetic advertisement being clicked.

Activation information for the synthetic advertisement may be stored in a performance statistics data store (step 620). The activation information may include an identifier of the synthetic advertisement that the user clicked on or otherwise activated, a time that the navigational element was activated, and user information related to the user that activated the navigational element the synthetic advertisement, such as an IP address, geographic location, and/or other information, such as a Uniform Resource Locator (URL) of a web content on which the synthetic advertisement was displayed. The information stored in the performance statistics database may be used to generate reports that may be used to determine the effectiveness of new categories of electronic advertisement.

A determination is made whether a landing page for the navigational element is defined (step 625). According to some embodiments, a user activating the navigational element associated with a synthetic advertisement may be redirected to a web page or other content related to a product and/or service provider associated with a synthetic advertisement. The user may be directed to the web page or other content associated with the navigational element (step 660). The landing page for a synthetic advertisement may be determined at the time that the synthetic advertisement is generated. For example, a user may identify a set of keywords associated with a category of electronic advertisement to be tested, and these keywords may be submitted to a structured search engine that includes electronic advertisements as part of the search results. Information from an electronic advertisement returned as part of the search results could be extracted and used to generate the content of the synthetic advertisement and to determine a landing page for the navigational element of the synthetic advertisement. For example, a synthetic advertisement for "wedding cake designs" may be redirected to a website of a bakery that specializes in creating cakes for weddings and other special events.

If a landing page is not predefined for the navigational element, activating the navigational element of a synthetic advertisement may result in a set of keywords associated with the synthetic element to be submitted as search terms to a structured search engine that includes electronic advertisements with search results provided by the search engine (step 630). Additional information the category associated with the synthetic advertisement and/or information about the user that clicked on or otherwise activated the navigational element of the synthetic advertisement may also be provided as search terms to the structure search engine. The electronic advertisements provided with the search results generated by the search engine should be contextually related to the keywords that were provided to the search engine, and thus, any electronic advertisements provided by the search engine may be related to the category of synthetic advertisement to be tested.

A set of search results may be received from the search engine (step 640), and the results used to generate a landing page for the user who activated the navigational element of the synthetic advertisement (step 650). According to some embodiments, a landing page may be generated from the search results submitted to the search engine and the user redirected to the landing page that provides the search results. In some embodiments, the user may be directed to a web page associated with a selected one of the search results. For example, the user may be directed to a landing page that is derived from an electronic advertisement that was returned by the search engine.

Figure 7:
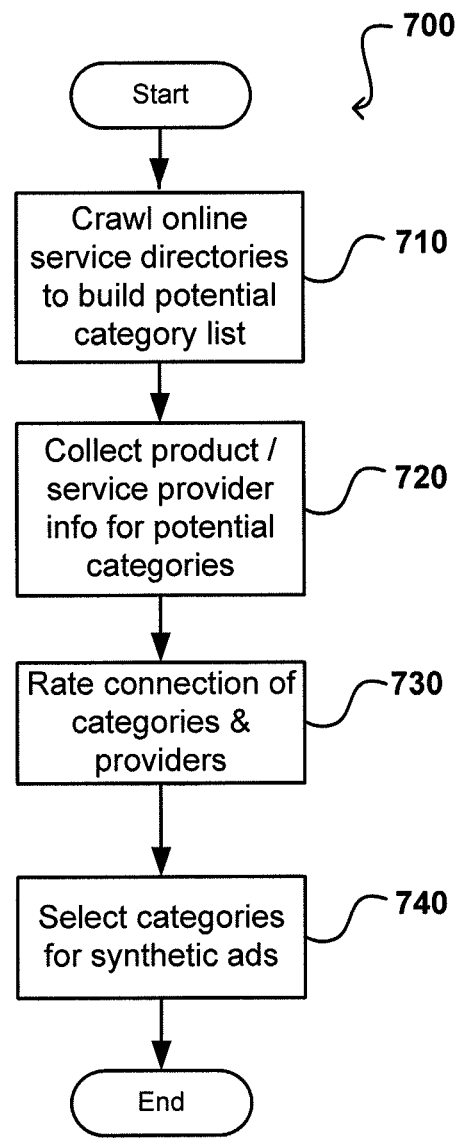
FIG. 7 illustrates steps of a process for creating potential new categories for synthetic advertisement content in accordance with one embodiment.

FIG. 7 illustrates steps of a process 700 for creating potential new categories for synthetic advertisement content in accordance with one embodiment. According an embodiment, a category creation module of a synthetic advertisement manager may "crawl" or systematically browse an online product and/or service provider directory, such as an online yellow pages provider to identify potential new categories for testing (step 710). For example, an online yellow pages provider may categorize product and/or service providers into various categories arranged in a hierarchical structure of browse nodes. Where each browse node represents a category and one or more product and/or service providers may be associated with a category. The category creation module of the synthetic advertisement manager may access a top level node of the online directory and begin systematically browsing each category and subcategory of providers listed in the directory to identify categories or subcategories that may be an effective new category of synthetic advertisement. For example, the category creation module may compare each category identified in the online directory with categories in an advertisement categories data store that includes categories of synthetic advertisements that have been or are currently being tested for effectiveness. If a category is identified in the online directory that has not already included in the advertisement categories data store, the category may be added to a list of potential new categories that may be tested using synthetic advertisements.

A set of product and/or service provider information associated with each of the potential new categories may be collected (step 720). For example, information such as the name, telephone number, address, description, email address, website, and/or other information associated included in the online product and/or service provider directory for each product and/or service provider associated with a new potential category may be collected. In some embodiments, a minimum number of product and/or service provider may need to be associated with a category before the category may be selected for inclusion in the set of potential new categories to be tested using synthetic advertisements. In some embodiments, information for a small subset, e.g. five, product and/or service provider associated with a new potential category may be collected if a large number of product and/or service providers are associated with a particular potential new category.

A connection between each potential new category and the set of selected product and/or service providers for that category may be rated to determine how effectively the category represents the selected product and/or service providers with which the category is associated (step 730). According to some embodiments, the rating of the connection between each potential new category and the set of selected product and/or service providers for that category may be rated manually using human intelligence. For example, an administrator or designer of the electronic advertisement content provider may review a potential new category and the set of selected product and/or service providers associated with that category and assign a score to the connection. For example, in an embodiment, a score of "1" to "100" may be assigned to a connection to indicate how effectively the category represents the selected product and/or service providers, where a score of "1" indicates little to no relevance and a score of "100" indicates that the category is highly relevant. According to some embodiments, rating the connection may be outsourced to a third party outsourcing and the scores of multiple reviewers may be averaged to determine a rating for the connection. According to another embodiment, the rating of the connection between the category and the set of selected product and/or service providers for that category may be based on user traffic. For example, a higher rating may be assigned to a connection that has a higher percentage of visitors that browse through the category and click on an advertisement in that category.

A set of one or more categories for use as synthetic advertisement categories may be selected from the set of potential new categories (step 740). The set of categories selected may be based on various criteria. For example, the set of categories selected may be a set of categories having received a highest set of scores or having received a score above a predetermined threshold. According to some embodiments, a set of categories having a higher traffic count, and thus, a higher number of users accessing the content, may be selected.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method for providing electronic advertisements, the method comprising:
   selecting, by one or more processors of one or more computer systems, at least one category for testing from a set of potential categories, the at least one category for testing being selected based at least in part on a respective rating of a respective connection between the at least one category and a respective set of products or services associated with the at least one category;
   generating, by the one or more processors, at least one test advertisement for the at least one category for testing, the at least one test advertisement representing a product or a service related to the at least one category for testing, the at least one test advertisement including a navigational element, that when activated, collects information related to performance of the at least one category;

receiving, by the one or more processors, a request for an electronic advertisement relating to the at least one category; and providing, by the one or more processors, the at least one test advertisement in response to the request for the electronic advertisement.

2. The method of claim 1, further comprising:

browsing an online directory of businesses providing products or services, the online directory being organized into categories of businesses;

selecting a set of potential categories for testing using test advertisements, the set of potential categories being selected from the categories of businesses of the online directory;

selecting the respective set of businesses associated with each potential category; and rating the respective connection between each potential category and the respective set or businesses associated with the potential category.

3. The method of claim 2, wherein rating the respective connection between each potential category and the respective set of businesses associated with the potential category further comprises:

presenting the potential category and the respective set of businesses associated with the potential category to a reviewer; and receiving the respective rating of the respective connection from the reviewer.

4. The method of claim 3, wherein presenting the potential category and the respective set of businesses associated with the potential category are presented to a plurality of reviewers, and the method further comprises:

averaging ratings received from the plurality of reviewers to determine the respective rating for the connection.

5. The method of claim 2, wherein rating the respective connection between each potential category and the respective set of businesses associated with the potential category is based at least in part on a percentage of visitor traffic to the respective set of businesses associated with the potential category.

6. The method of claim 1, wherein generating the at least one test advertisement further comprises:

submitting a search query to an online directory of businesses to identify businesses related to the at least one category for testing;

receiving a list of businesses providing the respective set of products or services related to the at least one category for testing;

selecting, from the list of businesses, a business providing the respective set of products or services related to the at least one category for testing; and creating at least one electronic advertisement that includes information related to the selected business.

7. The method of claim 1, wherein generating the at least one advertisement further comprises:

identifying a set of keywords associated with the at least one category for testing; and creating at least one electronic advertisement that includes the navigational element that, when activated by a user, causes the set of keywords to be submitted to a structured search engine and to direct the user to a landing page related to an advertiser included with a set of search results provided by the structured search engine.

8. A system for providing electronic advertisements, comprising:

a processor; and a memory device including instructions that, when executed by the processor, cause the processor to:

select at least one category for testing from a set of potential, the at least one category for testing being selected based at least in part on a respective rating of a respective connection between the at least one category and a respective set of products or services associated with the at least one category;

generate at least one test advertisement for the at least one category for testing, the at least one test advertisement representing a product or a service related to the at least one category, the at least one test advertisement including a navigational element, that when activated, collects information related to performance of the at least one category for testing;

receive a request for an electronic advertisement relating to the at least one category for testing; and provide the at least one test advertisement in response to the request for the electronic advertisement.

9. The system of claim 8, wherein the instructions, when executed by the processor, further cause the processor to:

browse an online directory of businesses providing products or services, the online directory being organized into categories of businesses;

select a set of potential categories for testing using test advertisements, the set of potential categories being selected from the categories of businesses of the online directory;

select the respective set of businesses associated with each potential category; and rate the respective connection between each potential category and the respective set of businesses associated with the potential category.

10. The system of claim 9, wherein the instructions to cause the processor to rate the respective connection between each potential category and the respective set of businesses associated with the potential category, when executed by the processor, further cause the processor to:

present the potential category and the respective set of businesses associated with the potential category to a reviewer; and receive the respective rating of the respective connection from the reviewer.

11. The system of claim 10, wherein the instructions to cause the processor to present the potential category and the respective set of businesses associated with the potential category to a reviewer, when executed by the processor, further cause the processor to to present the potential category and the respective set of businesses to a plurality of reviewers, and the instructions, when executed by the processor, further cause the processor to:

average ratings received from the plurality of reviewers to determine the respective rating for the connection.

12. The system of claim 9, wherein rating the respective connection between each potential category and the respective set of businesses associated with the potential category is based at least in part on a percentage of visitor traffic to the set of businesses associated with the potential category.

13. The system of claim 8, wherein the instructions to cause the processor to generate the at least one test advertisement for the potential category, further cause the processor to:

submit a search query to an online directory of businesses to identify businesses related to the at least one category for testing;

receive a list of businesses providing the respective set of products or services related to the at least one category for testing;

select, from the list of businesses, a business providing the respective set of products or services related to the at least one category for testing; and create at least one electronic advertisement that includes information related to the selected business.

14. The system of claim 8, wherein the instructions to cause the processor to generate the at least one test advertisement for the potential category, further cause the processor to:

identify a set of keywords associated with the at least one category for testing; and create at least one electronic advertisement that includes the navigational element that, when activated by a user, causes the set of keywords to be submitted to a structured search engine and to direct the user to a landing page related to an advertiser included with a set of search results provided by the structured search engine.

15. A computer program product for providing electronic advertisements, the program being embedded in a non-transitory computer-readable storage medium and including instructions that, when executed by at least one computing device, cause the at least one computing device to:

select at least one category for testing from a set of potential categories, the at least one category for testing being selected based at least in part on a respective rating of a respective connection between the at least one category and a respective set of products or services associated with the at least one category;

generate at least one test advertisement for the at least one category for testing, the at least one test advertisement representing a product or a service related to the at least one category for testing, the at least one test advertisement including a navigational element, that when activated, collects information related to performance of the at least one category for testing;

receive a request for an electronic advertisement relating to the at least one category for testing; and provide the at least one test advertisement in response to the request for the electronic advertisement.

16. The computer program product of claim 15, further comprising instructions that, when executed, further cause the at least one computing device to:

browse an online directory of businesses providing products or services, the online directory being organized into categories of businesses;

select a set of potential categories for testing using test advertisements, the set of potential categories being selected from the categories of businesses of the online directory;

select the respective set of businesses associated with each potential category; and rate the respective connection between each potential category and the respective set of businesses associated with the potential category.

17. The computer program product of claim 16, wherein the instructions to cause the at least one computing device to rate the respective connection between each potential category and the respective set of businesses associated with the potential category, when executed by the at least one computing device, further cause the at least one computing device to:

present the potential category and the respective set of businesses associated with the potential category to a reviewer; and receive the respective rating of the respective connection from the reviewer.

18. The computer program product of claim 17, wherein the instructions to cause the at least one computing device to present the potential category and the respective set of businesses associated with the potential category, when executed by the at least one computing device, further cause the at least one computing device to present the potential category and the set of businesses to a plurality of reviewers, and the instructions, when executed by the at least one computing device, further cause the at least one computing device to:

average ratings received from the plurality of reviewers to determine the rating for the connection.

* * * * *